US011084402B2

(12) United States Patent
Schmitz et al.

(10) Patent No.: US 11,084,402 B2
(45) Date of Patent: Aug. 10, 2021

(54) EXTENDIBLE PROTECTIVE ELEMENT FOR USE IN A CHILD SAFETY SEAT

(71) Applicant: BRITAX RÖMER KINDERSICHERHEIT GMBH, Leipheim (DE)

(72) Inventors: Michael Schmitz, Ulm (DE); Richard Henseler, Ulm (DE); Florian Berg, Ulm (DE)

(73) Assignee: Britax Romer Kindersicherheit GmbH, Leipheim (DE)

( * ) Notice: Subject to any disclaimer, the term of this patent is extended or adjusted under 35 U.S.C. 154(b) by 80 days.

(21) Appl. No.: 16/255,894

(22) Filed: Jan. 24, 2019

(65) Prior Publication Data
US 2019/0225122 A1    Jul. 25, 2019

(30) Foreign Application Priority Data
Jan. 24, 2018   (EP) ..................................... 18153176

(51) Int. Cl.
| | |
|---|---|
| *B60N 2/28* | (2006.01) |
| *B60N 2/90* | (2018.01) |
| *F16B 5/02* | (2006.01) |
| *F16B 33/00* | (2006.01) |
| *B60N 2/42* | (2006.01) |
| *F16B 37/12* | (2006.01) |

(52) U.S. Cl.
CPC ......... *B60N 2/2884* (2013.01); *B60N 2/2872* (2013.01); *B60N 2/4235* (2013.01); *B60N 2/929* (2018.02); *F16B 5/0233* (2013.01); *F16B 33/006* (2013.01); *F16B 37/125* (2013.01)

(58) Field of Classification Search
None
See application file for complete search history.

(56) References Cited

U.S. PATENT DOCUMENTS

| | | | | |
|---|---|---|---|---|
| 4,770,468 | A | * | 9/1988 | Shubin ................. B60N 2/2821 297/256.15 |
| 4,858,997 | A | * | 8/1989 | Shubin ................. B60N 2/2821 297/487 |

(Continued)

FOREIGN PATENT DOCUMENTS

| | | |
|---|---|---|
| EP | 2826662 A1 | 1/2015 |
| WO | 2014120707 A1 | 8/2014 |

OTHER PUBLICATIONS

Office Action issued in corresponding Canadian Patent Application No. 3,031,065 dated Dec. 4, 2019, all enclosed pages cited.

(Continued)

*Primary Examiner* — David R Dunn
*Assistant Examiner* — Christopher E Veraa
(74) *Attorney, Agent, or Firm* — K&L Gates LLP

(57) ABSTRACT

An extendible protective element for use in a child safety seat is disclosed. The extendible protective element comprises a first thread component comprising a first external thread and a first internal thread, and a second thread component comprising a second external thread, wherein the first thread component is rotatably connected to the second thread component via the first internal thread of the first thread component and the second external thread of the second thread component.

18 Claims, 4 Drawing Sheets

(56) References Cited

U.S. PATENT DOCUMENTS

| | | | | |
|---|---|---|---|---|
| 5,881,979 A | * | 3/1999 | Rozier, Jr. | A47B 91/024 |
| | | | | 248/188.4 |
| 7,090,454 B2 | * | 8/2006 | Shain | F16B 21/065 |
| | | | | 411/190 |
| 8,056,972 B2 | * | 11/2011 | Marsden | B60N 2/2884 |
| | | | | 297/216.1 |
| 2016/0152164 A1 | * | 6/2016 | Hass | B60N 2/2884 |
| | | | | 297/216.11 |
| 2018/0172043 A1 | | 6/2018 | Bräutigam | |
| 2020/0017062 A1 | * | 1/2020 | Chi | B60N 2/2851 |

OTHER PUBLICATIONS

Examiner's Requisition issued in corresponding Canadian Application No. 3,031,065 dated May 19, 2020, all enclosed pages cited.

* cited by examiner

EXTENDIBLE PROTECTIVE ELEMENT FOR USE IN A CHILD SAFETY SEAT

This application claims priority to European application number 18153176.5 filed Jan. 24, 2018, the entire contents of which are hereby incorporated by reference in its entirety.

The present invention relates to an extendible protective element for a child safety seat. The extendible protective element is designed to be sufficiently extendible for side impact protection, be fully retractable to reduce the size of the child safety seat, and be particularly suitable for mounting at the shell or the side wing of a shell of a child safety seat.

Many older conventional child safety seats have been designed to provide optimized protection in frontal crash configurations. About 25% of all crashes, however, occur from the side. Injuries received in side impact crashes are generally more severe than those typically received in front crashes. It is estimated that up to 30% of all fatalities are a result of side impact crashes. As a result, there is a great need for effective and reliable side impact protection in child safety seats.

Therefore, current conventional child safety seats are also designed to provide improved side impact protection. To this end, various external protective elements, also called external side impact elements, have been engineered: Protective elements permanently attached to the exterior of a child safety seat, removable protective elements, and integrated protective elements.

Side impact elements permanently attached to the exterior of a child safety seat increase the overall dimensions of a child safety seat significantly and permanently. In many situations, for example in small vehicles, this might turn out to be a problem. Further, legal requirements regarding the size of a child safety seat (e.g. standards R44 and R129) have to be met.

Side impact elements which can be removed alleviate the problem of increased size but bear the risk of misuse or of getting lost. If the parents do not attach the side impact elements, additional side impact protection is not provided by the child safety seat.

Integrated adjustable side impact elements alleviate the problem of increased size and minimize the risk of misuse. To this end, integrated rotatable side impact elements have been designed, which can be adjusted using a rotation mechanism or screw mechanism.

The screw mechanism is self-explanatory and easy to handle as the rotatable side impact element can be extended and retracted by turning the side impact element anti-clockwise and clockwise, respectively, similarly to a screw. Further, the threads of the screw mechanism are self-locking, i.e. there is no misuse potential due to incorrect locking.

In addition, the screw mechanism of the adjustable side impact element is easy to assemble and the amount of required parts is low.

An integrated side impact element for a child safety seat is advantageously embedded in the shell of a child safety seat, in particular, in a side wing of the shell, to reduce the space required by the protective element when it is fully retracted. However, an extendible and retractable protection element requires a certain amount of design space to be fully retractable. When mounted in the shell or the side wing of the shell, the available space is limited by the size of the shell or the side wing of the shell at the respective location. Thus, the working distance, which is the maximum extension length, is limited by the available design space.

Therefore, it is an object of the invention to provide an extendible protective element for use in a child safety seat which is sufficiently extendible as well as fully retractable and takes up a reduced amount of design space.

This and other objects are achieved by the extendible protective element for use in a child safety seat according to claim 1. Advantageous embodiments of the present invention are indicated in dependent claims 2-16.

According to an aspect of the invention, there is provided an extendible protective element for use in a child safety seat, wherein the extendible protective element comprises a first thread component comprising a first external thread and a first internal thread, and a second thread component comprising a second external thread, wherein the first thread component is rotatably connected to the second thread component via the first internal thread of the first thread component and the second external thread of the second thread component.

By providing an extendible protective element comprising two thread components wherein the external thread of the second thread component is screwed in the internal thread of the first thread component, the required design space of the extendible protective element can be reduced without reducing the maximum extension length of the extendible protective element. Thus, the extendible protective element according to the invention requires less design space with, at the same time, constant, i.e. not reduced, maximum extension length.

Advantageously, the extendible protective element further comprises a cover connected to the second thread component for co-rotation.

Advantageously, the extendible protective element further comprises a housing having a second internal thread and configured to be rotationally coupled to the first thread component via the first external thread of the first thread component and the second internal thread of the housing.

The housing can be mounted on a shell of a child safety seat to attach the extendible protective element to the child safety seat.

Alternatively, the first thread component may be configured to be rotationally coupled to a third internal thread provided in a shell of the child safety seat, wherein the first external thread of the first thread component is a counter-thread of the third internal thread provided in the shell of the child safety seat.

In this case, the extendible protective element can be attached to the child safety seat by screwing the external thread of the first thread component in a suitable internal thread (i.e. counter thread) provided in the shell of the child safety seat.

Advantageously, a friction occurring between the first internal thread of the first thread component and the second external thread of the second thread component when rotated relatively to each other is different from a friction occurring between the first external thread of the first thread component and the second internal thread of the housing when rotated relatively to each other.

If the friction occurring between the first thread component and second thread component is different from the friction occurring between the first thread component and the housing, one thread component will be extended prior to the other thread component. Simultaneous movement of both threads is not necessary and/or even not desired as the handling is more convenient for the user if the threads will be moved sequentially in the same order each time instead of moving randomly, i.e. alternately and in random order.

Advantageously, a friction occurring between the first internal thread of the first thread component and the second external thread of the second thread component when rotated relatively to each other is different from a friction occurring between the first external thread of the first thread component and the third internal thread provided in the shell of the child safety seat when the first thread component is rotated relatively to the third internal thread.

If the friction occurring between the first thread component and second thread component is different from the friction occurring between the first thread component and the thread provided in the shell of the child safety seat, one thread component will be extended prior to the other thread component. Simultaneous movement of both threads is not necessary and/or even not desired as the handling is more convenient for the user if the threads will be moved sequentially in the same order each time instead of moving randomly, i.e. alternately and in random order.

The friction between external and internal threads is dependent from the clearance or tolerance existing between the external and internal threads as well as the pitch of the threads. Thus, the friction of external and internal threads can easily be controlled by choosing suitable allowances between the pitch diameters of the respective external and internal threads and/or suitable pitches of the threads.

Advantageously, the first thread component and the second thread component are made of plastic material. However, the first thread component and the second thread component may also be made of other materials such as metal, e.g. aluminum, or metal alloys, or a combination thereof.

Advantageously, the cover and the second thread component comprise an anti-twist protection to allow co-rotation of the cover and the second thread component, but prevent rotation of the cover relative to the second thread component.

The anti-twist protection may be formed by a form locking connection between particular parts of the cover and the second thread component. For example, the cover may comprise a plurality of ribs and the second thread component may comprise corresponding cutouts supporting the ribs of the cover. Alternatively, the cover and the second thread component may comprise engaging serrations which prevent the cover and the second thread component from being rotated relatively to each other.

Advantageously, the first external thread of the first thread component comprises a first end stop, such as a rib, for example, at one end which closes the first external thread at the one end and a snap hook at the other end which, in a first position of the snap hook, blocks the first external thread to function as a second end stop at the other end, and, in a second position of the snap hook, does not block the first external thread to allow the first external thread of the first thread component to be inserted into the second internal thread of the housing or into the third internal thread provided in the shell of the child safety seat.

Advantageously, the second external thread of the second thread component comprises a third end stop, such as a rib for example, at one end which closes the second external thread at the one end. At the other end of the second external thread of the second thread component, the cover advantageously functions as an end stop. The second external thread of the second thread component can be screwed in the first internal thread of the first thread component prior to mounting the cover on the second thread component.

Advantageously, a plurality of discrete intermediate positions are defined by a plurality of engagement points between a fully retracted state and a fully extended state of the extendible protective element.

Advantageously, the plurality of engagement points between respective internal and external threads are defined by a plurality of indentations formed in the external threads and a protrusion respectively formed at the internal threads.

The plurality of engagement points indicate the user an intermediate position. As the first thread component and the second thread component engage perceptibly at the engagement points, the user senses that the extension mechanism is adjusted to an intermediate position.

Advantageously, the cover comprises an indication which shows a rotation angle of the cover and/or indicates whether the extendible protective element is fully extended or fully retracted.

The indication may, for example, be a word and/or picture, such as a logo or branding, which has the correct orientation if the extendible protective element is fully retracted or fully extended.

In addition, the indication may also indicate that the extendible protective element is adjusted to an intermediate position. For example, a word and/or picture will have the correct orientation when the extendible protective element is adjusted to the intermediate positions or end positions (fully retracted and fully extended).

The desired orientation of the cover of the extendible protective element in the end positions and/or intermediate positions can be achieved by using screw threads having suitable pitches. For example, after one turn (360°) of the cover, the next intermediate position or the end position may be reached.

Accordingly, the user may both see and sense that the extendible protective element is adjusted to an intermediate position.

According to a further aspect of the invention, there is provided a child safety seat comprising the extendible protective element specified above.

Advantageously, the child safety seat further comprises a housing integrally formed with a shell of the child safety seat and having a fourth internal thread configured to be rotationally coupled to the first external thread of the first thread component.

In this way, the production process of the child safety seat can be simplified and the structural complexity of the child safety seat can be reduced.

Specific embodiments of the invention will now be described by way of example and with reference to the accompanying drawings, in which.

Figure 2:
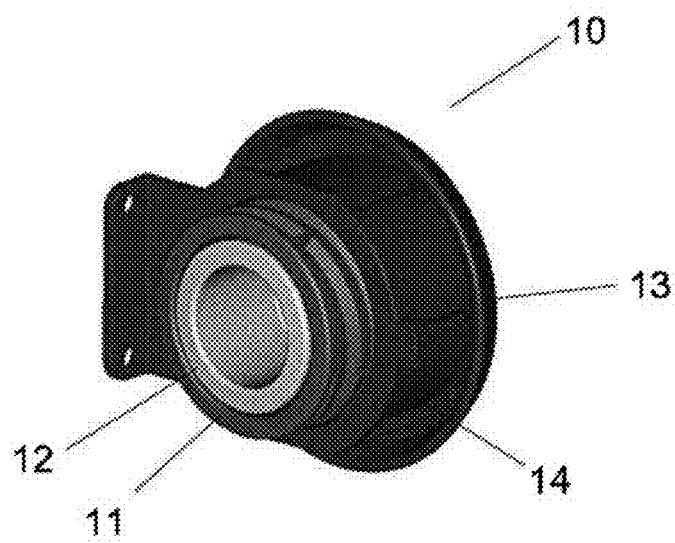
FIG. 2 shows an embodiment of an extendible protective element in accordance with the invention.
Figure 3:
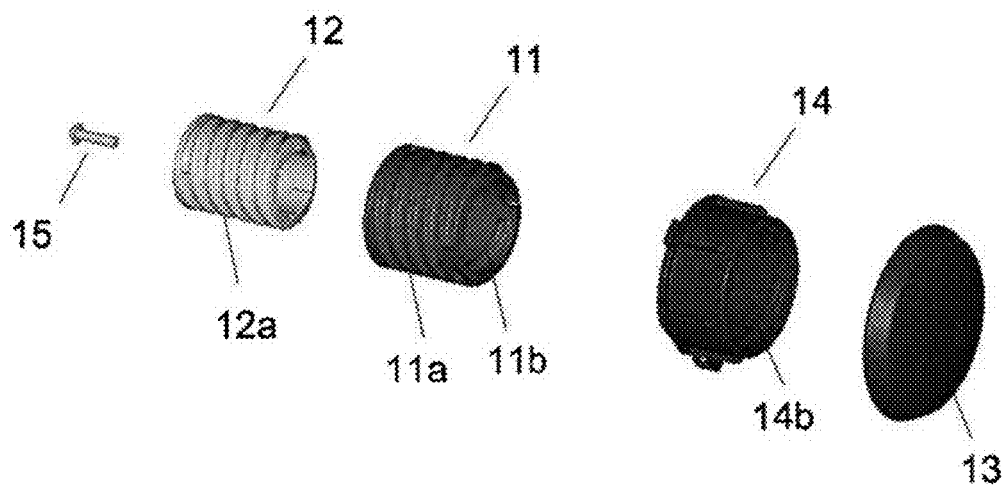
FIG. 3 shows the extendible protective element of FIG. 2 in an exploded view.
Figure 5A:
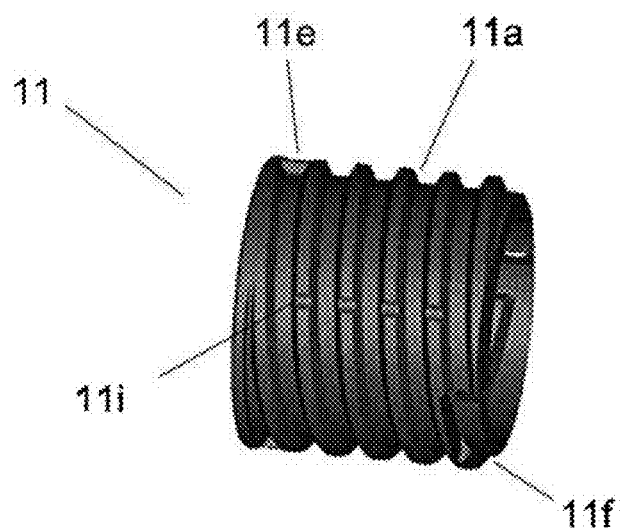
Figure 5B:
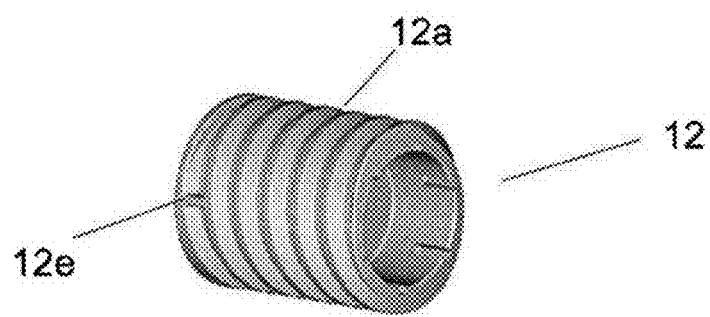

FIGS. 5a and 5b show the first thread component 11 and the second thread component 12 of the embodiment shown in FIGS. 2 and 3.

Figure 1:
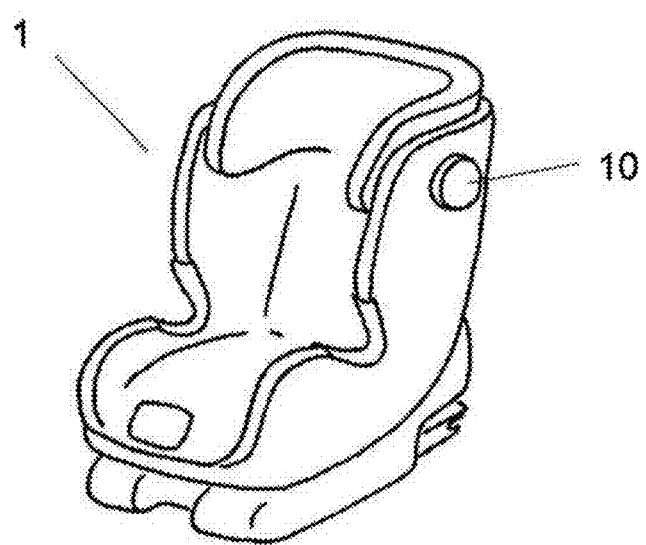
FIG. 1 shows a child safety seat comprising an embodiment of an extendible protective element in accordance with the invention.

FIG. 1 shows a child safety seat 1 comprising an embodiment of an extendible protective element 10 in accordance with the invention. The extendible protective element 10 is advantageously embedded in a side wing of the shell of the child safety seat 1. The side wing itself provides for improved side impact protection by shielding a child sitting in the child safety seat 1 from lateral impacts. This protective effect is enhanced by the extendible protective element 10 embedded into the side wing. The child safety seat 1 may comprise a housing integrally formed with a shell of the child safety seat 1, wherein the housing receives and supports the extendible protective element 10. Alternatively, the extendible protective element 10 may comprise a housing which is advantageously fixed to the side wing of the shell of the child safety seat.

In both cases, forces which act on the extendible protective element 10 will be transferred to the shell, or in particular, the side wing of the shell, of the child safety seat 1 which is configured to receive mechanical forces and transfer them away from the child in the child safety seat 1. In case of a side impact, it is however important to achieve an early contact with an intruding door of the vehicle in order to keep survival space for a child seated in the child safety seat.

Thus, the maximum extension length of the extendible protective element 10 should be as large as possible so that the extendible protective element 10 extends to the vehicle door or at least near the vehicle door, when the protective element 10 is fully extended.

A screw mechanism is used for the extendible protective element 10 as it can be adjusted continuously and is easy to handle. The extendible protective element 10 can be extended and retracted by turning its cover anti-clockwise and clockwise, respectively, similarly to a screw. As the threads of the screw mechanism are self-locking in any position, there is no risk of misuse due to incorrect locking. In addition, a screw mechanism is easy to assemble and the amount of required parts is low.

However, an extendible and retractable protective element having a screw mechanism requires a certain amount of design space to be fully retractable. When mounted in the shell or the side wing of the shell, the available space is limited by the thickness of the shell or the side wing of the shell at the respective location. Thus, the working distance of the extendible protective element 10, which is the maximum extension length, is limited by the available design space.

The extendible protective element according to the invention has been developed to address the problem of limited design space.

FIGS. 2 and 3 show an embodiment of an extendible protective element in accordance with the invention.

The extendible protective element 10 shown in FIGS. 2 and 3 comprises a first or outer thread component 11, a second or inner thread component 12, a cover 13, a housing 14 and a screw 15, wherein at least one of the first thread component 11, the second component 12, the cover 13, the housing 14, and the screw 15 are advantageously made of plastic material. Preferably, the first thread component 11, the second component 12, the cover 13, the housing 14, and the screw 15 are made of plastic material having low weight and involving low manufacturing costs.

The first thread component 11 comprises a first external (male) thread 11a and a first internal (female) thread 11b. The second thread component 12 comprises a second external thread 12a and the housing 14 comprises a second internal thread 14b. The cover 13 is advantageously attached to the second thread component 12 by a plastic screw 15. The first thread component 11 is rotatably connected to the second thread component 12 via the first internal thread 11b of the first thread component 11 and the second external thread 12a of the second thread component 12. The first thread component 11 is configured to be rotationally coupled to the housing 14 via the first external thread 11a of the first thread component and the second internal thread 14b of the housing 14.

By providing the extendible protective element 10 with two coaxially arranged thread components 11 and 12 wherein the external thread 12a of the second thread component 12 is screwed in the internal thread 11b of the first thread component 11, the length of the extendible protective element 10 can be reduced without reducing the maximum extension length of the extendible protective element 10. Therefore, the extendible protective element according to the invention requires less design space with, at the same time, constant, i.e. not reduced, maximum extension length. Or, for a given design space, the extendible protective element according to the invention features an increased maximum extension length. For example, if a particular child safety seat offers a design space which facilitates a screw thread which allows an extension of 24 mm, the extendible protective element 10 will achieve a total extension length of up to 48 mm with both thread components fully extended.

An extendible protective element comprising three or more coaxially arranged thread components is also feasible. For example, in case the extendible protective element comprises three coaxially arranged thread components, a third (inner) thread component is screwed into a second (middle) thread component and the second thread component is screwed into a first (outer) thread component. Thus, if required, the maximum extension length can be further increased for a given design space by increasing the number of thread components.

Advantageously, the extendible protective element of the invention further comprises one or more additional thread components rotatably and directly or indirectly connected to the first thread component via the first external thread of the first thread component.

Advantageously, a friction occurring between the first internal thread 11b of the first thread component 11 and the second external thread 12a of the second thread component 12 when rotated relatively to each other is different from a friction occurring between the first external thread 11a of the first thread component 11 and the second internal thread 14b of the housing 14 when rotated relatively to each other.

If the friction occurring between the first thread component 11 and second thread component 12 is different from the friction occurring between the first thread component 11 and the housing 14, one thread component will be extended prior to the other thread component. Simultaneous movement of both threads is not necessary and even not desired as the handling is more convenient for the user if the threads will be moved sequentially in the same order each time instead of moving randomly, i.e. alternately and in random order.

The friction between external and internal threads is dependent from the clearance or tolerance existing between the external and internal threads as well as the pitch of the threads. Thus, the friction of external and internal threads can easily be controlled by choosing suitable allowances between the pitch diameters of the respective external and internal threads and/or suitable pitches of the threads.

Figure 4A:
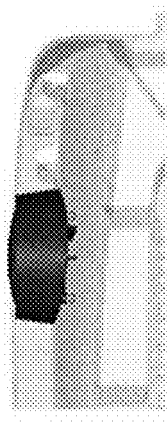
FIGS. 4a, 4b and 4c show a further embodiment of an extendible protective element in accordance with the invention in a fully retracted position (FIG. 4a), a partly extended position (FIG. 4b), and an almost fully extended position.
Figure 4B:
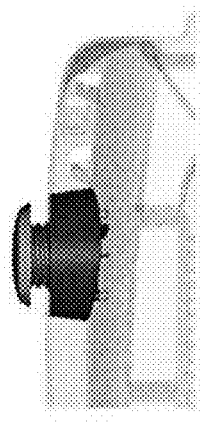
Figure 4C:
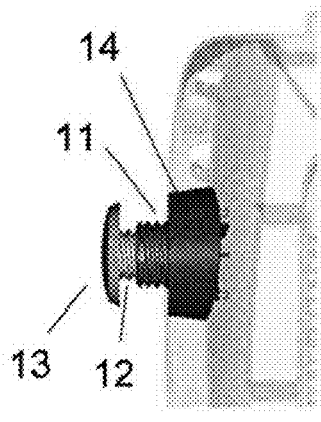

FIGS. 4a, 4b and 4c show a further embodiment of an extendible protective element in accordance with the invention in a fully retracted position (FIG. 4a), a partly extended position (FIG. 4b), and an almost fully extended position (FIG. 4c).

In this embodiment, the friction occurring between the first thread component 11 and the housing 14 is lower than the friction occurring between the first thread component 11 and second thread component 12. Thus, as can be seen in FIGS. 4a, 4b and 4c, the first (outer) thread component 11 gets extended first when turning the cover 13 of the extendible protective element 10 counter-clockwise. After the first thread component 11 has been fully extended, the second thread component 12 starts to get extended.

The cover 13 and the second thread component 12 advantageously comprise an anti-twist protection to allow co-rotation of the cover 13 and the second thread component 12, but prevent rotation of the cover 13 relative to the second thread component 12.

The anti-twist protection may be formed by a form locking connection between particular parts of the cover 13 and the second thread component 12. For example, the cover 13 may comprise a plurality of ribs and the second thread component 12 may comprise corresponding cutouts supporting the ribs of the cover. Alternatively, the cover 13 and the second thread component 12 may comprise engaging serrations which prevent the cover and the second thread component from being rotated relatively to each other.

FIGS. 5a and 5b show the first thread component 11 and the second thread component 12 of the embodiment shown in FIGS. 2 and 3.

The first external thread 11a of the first thread component 11 preferably comprises a first end stop, such as a rib 11e as shown in FIG. 5a, at one end which closes the first external thread 11a at the one end and a snap hook 11f at the other end which, in a first position of the snap hook 11f, blocks the first external thread 11a to function as a second end stop at the other end, and, in a second position of the snap hook, does not block the first external thread 11a to allow the first external thread 11a of the first thread component 11 to be inserted into the second internal thread 14b of the housing 14.

The second external thread 12a of the second thread component 12 also comprises an end stop, such as a rib 12e as shown in FIG. 5b, at one end which closes the second external thread 12a at the one end. At the other end of the second external thread 12a of the second thread component 12, the cover 13 advantageously functions as an end stop. The second external thread 12a of the second thread component 12 can be screwed in the first internal thread 11b of the first thread component 11 prior to attaching the cover 13 to the second thread component 12. When the cover 13 is attached to the second thread component 12, it functions as an end stop at the other end of the second external thread 12a.

A plurality of discrete intermediate positions may advantageously be defined by a plurality of engagement points between a fully retracted state and a fully extended state of the extendible protective element 10.

To this end, the first thread component 11 may comprise a plurality of indentations 11i formed in the first external thread 11a and the housing 14 may comprise at least one protrusion formed at the second internal thread 14b.

Similarly, the second thread component 12 may comprise a plurality of indentations formed in the second external thread 12a and the first thread component 11 may comprise at least one protrusion formed at the first internal thread 11b.

The plurality of engagement points preferably indicate the user an intermediate position. The first thread component 11 and the second thread component 12 as well as the first thread component 11 and the housing 14 may engage perceptibly at the respective engagement points. Thus, the user can sense if the extendible protective element 10 is adjusted to one of the plurality of intermediate positions when turning the cover 13 of extendible protective element 10.

The cover 13 may advantageously comprise an indication which shows a rotation angle of the cover 13 and/or indicates whether the extendible protective element 10 is fully extended or fully retracted.

The indication may, for example, be a word and/or picture, such as a logo or branding, which has the correct orientation if the extendible protective element 10 is fully retracted or fully extended.

In addition, the indication may also indicate that the extendible protective element 10 is adjusted to an intermediate position. For example, a word and/or picture will have the correct orientation when the extendible protective element 10 is adjusted to an intermediate position or an end position (fully retracted and fully extended).

The desired orientation of the cover 13 of the extendible protective element 10 in the end positions and/or intermediate positions can be achieved by using screw threads having suitable pitches. For example, after one turn (360°) of the cover 13, the next intermediate position or an end position may be reached.

Accordingly, the user may both see and sense that the extendible protective element 10 is adjusted to an intermediate position.

The invention claimed is:

1. A child safety seat comprising an extendible protective element including:
    a first thread component comprising a first external thread and a first internal thread, and a second thread component comprising a second external thread;
    wherein the first thread component is rotatably connected to the second thread component via the first internal thread of the first thread component and the second external thread of the second thread component; and
    wherein a plurality of discrete intermediate positions are defined by a plurality of engagement points between a fully retracted state and a fully extended state of the extendible protective element.

2. The child safety seat of claim 1, further comprising a cover connected to the second thread component for co-rotation with the second thread component.

3. The child safety seat of claim 2, wherein the cover and the second thread component comprise an anti-twist protection to allow co-rotation of the cover and the second thread component, but prevent rotation of the cover relative to the second thread component.

4. The child safety seat of claim 2, wherein the cover comprises an indication which shows a rotation angle of the cover and/or indicates whether the extendible protective element is fully extended or fully retracted.

5. The child safety seat of claim 1, further comprising a housing having a second internal thread and configured to be rotationally coupled to the first thread component via the first external thread of the first thread component and the second internal thread of the housing.

6. The child safety seat of claim 5, wherein the first thread component is configured to be rotationally coupled to a third internal thread provided in a shell of the child safety seat, wherein the first external thread of the first thread component is a counter-thread of the third internal thread provided in the shell of the child safety seat.

7. The child safety seat of claim 6, wherein a friction occurring between the first internal thread of the first thread component and the second external thread of the second thread component when rotated relatively to each other is different from a friction occurring between the first external thread of the first thread component and the third internal thread provided in the shell of the child safety seat when the first thread component is rotated relatively to the third internal thread.

8. The child safety seat of claim 6, further comprising a fourth internal thread configured to be rotationally coupled to the first external thread of the first thread component.

9. The child safety seat of claim 5, wherein a friction occurring between the first internal thread of the first thread component and the second external thread of the second thread component when rotated relatively to each other is different from a friction occurring between the first external thread of the first thread component and the second internal thread of the housing when rotated relatively to each other.

10. The child safety seat of claim 1, wherein the first thread component and the second thread component are made of plastic material or of metal.

11. The child safety seat of claim 1, wherein the first external thread of the first thread component comprises a first end stop at one end which closes the first external thread at the one end and a snap hook at the other end which, in a first position of the snap hook, blocks the first external thread to function as a second end stop at the other end, and, in a second position of the snap hook, does not block the first external thread to allow the first external thread of the first thread component to be inserted into the second internal thread of the housing or into the third internal thread provided in the shell of the child safety seat.

12. The child safety seat of claim 11, wherein the second external thread of the second thread component comprises a third end stop at one end which closes the second external thread at the one end.

13. The child safety seat of claim 1, wherein the plurality of engagement points between respective internal and external threads are defined by a plurality of indentations formed in the external threads and a protrusion respectively formed at the internal threads.

14. The child safety seat of claim 1, further comprising one or more additional thread components rotatably and directly or indirectly connected to the first thread component via the first external thread of the first thread component.

15. A child safety seat comprising an extendible protective element including:
a first thread component comprising a first external thread and a first internal thread, and a second thread component comprising a second external thread;
wherein the first thread component is rotatably connected to the second thread component via the first internal thread of the first thread component and the second external thread of the second thread component; and
wherein the first external thread of the first thread component comprises a first end stop at one end which closes the first external thread at the one end and a snap hook at the other end which, in a first position of the snap hook, blocks the first external thread to function as a second end stop at the other end, and, in a second position of the snap hook, does not block the first external thread to allow the first external thread of the first thread component to be inserted into the second internal thread of the housing or into the third internal thread provided in the shell of the child safety seat.

16. The child safety seat of claim 15, wherein the second external thread of the second thread component comprises a third end stop at one end which closes the second external thread at the one end.

17. A child safety seat comprising an extendible protective element including:
a first thread component comprising a first external thread and a first internal thread;
a second thread component comprising a second external thread; and
a cover connected to the second thread component for co-rotation with the second thread component,
wherein the first thread component is rotatably connected to the second thread component via the first internal thread of the first thread component and the second external thread of the second thread component, and
wherein the cover comprises an indication which shows a rotation angle of the cover and/or indicates whether the extendible protective element is fully extended or fully retracted.

18. A child safety seat comprising an extendible protective element including:
a first thread component comprising a first external thread and a first internal thread;
a second thread component comprising a second external thread;
a fourth internal thread configured to be rotationally coupled to the first external thread of the first thread component; and
a housing having a second internal thread and configured to be rotationally coupled to the first thread component via the first external thread of the first thread component and the second internal thread of the housing,
wherein the first thread component is rotatably connected to the second thread component via the first internal thread of the first thread component and the second external thread of the second thread component, and
wherein the first thread component is configured to be rotationally coupled to a third internal thread provided in a shell of the child safety seat, wherein the first external thread of the first thread component is a counter-thread of the third internal thread provided in the shell of the child safety seat.

* * * * *